United States Patent
Zelbst et al.

(10) Patent No.: US 10,028,566 B2
(45) Date of Patent: Jul. 24, 2018

(54) PERSONAL HYGIENE ASSIST DEVICE

(71) Applicant: Sam Houston State University, Huntsville, TX (US)

(72) Inventors: Pamela J. Zelbst, Huntsville, TX (US); Scott Golightly, The Woodlands, TX (US); Devin McCullough, Spring, TX (US); Maureen Reynolds, Midlothian, TX (US)

(73) Assignee: Sam Houston State University, Huntsville, TX (US)

( * ) Notice: Subject to any disclaimer, the term of this patent is extended or adjusted under 35 U.S.C. 154(b) by 0 days.

(21) Appl. No.: 15/399,272

(22) Filed: Jan. 5, 2017

(65) Prior Publication Data

US 2017/0202340 A1    Jul. 20, 2017

Related U.S. Application Data

(60) Provisional application No. 62/276,614, filed on Jan. 8, 2016.

(51) Int. Cl.
*A45D 40/04* (2006.01)

(52) U.S. Cl.
CPC .................... *A45D 40/04* (2013.01)

(58) Field of Classification Search
CPC ..... A45D 40/04; A45D 40/06; B65D 83/0011
See application file for complete search history.

(56) References Cited

U.S. PATENT DOCUMENTS

| | | | | |
|---|---|---|---|---|
| 5,573,341 A | * | 11/1996 | Iaia | A45D 40/04 401/172 |
| 5,725,133 A | * | 3/1998 | Iaia | A45D 40/04 222/390 |
| 5,839,622 A | * | 11/1998 | Bicknell | A45D 40/04 222/390 |
| 2005/0178796 A1 | * | 8/2005 | Shraiber | B65D 83/0011 222/78 |
| 2007/0025799 A1 | * | 2/2007 | Crosnier | A45D 40/04 401/66 |
| 2011/0150555 A1 | * | 6/2011 | Yarlagadda | A45D 40/04 401/52 |
| 2014/0376986 A1 | * | 12/2014 | Arwatz | A45D 34/04 401/101 |
| 2016/0151803 A1 | * | 6/2016 | Arwatz | B65D 83/0011 401/172 |

* cited by examiner

*Primary Examiner* — Jennifer C Chiang
*Assistant Examiner* — Bradley Oliver
(74) *Attorney, Agent, or Firm* — Meyertons, Hood, Kivlin, Kowert & Goetzel, P.C.; Mark R. DeLuca

(57) ABSTRACT

In some embodiments, a personal hygiene assist system may assist an impaired user in using deodorant. The system may include a container comprising an opening on an upper first side, opposite to a lower second side. The opening may include a substantially oblong shape configured to hold at least a lower portion of a deodorant case. The lower portion of the deodorant case may include an activation mechanism which upon rotation exposes additional deodorant positioned in the deodorant case. In some embodiments, the system may include a handle coupled to a third side coupling the first and second sides. In some embodiments, the system may include an engaging mechanism positioned in the container and coupled to the handle. When the handle is rotated the engaging mechanism may engage and rotate the activation mechanism of the deodorant exposing additional deodorant positioned in the deodorant case.

15 Claims, 4 Drawing Sheets

PERSONAL HYGIENE ASSIST DEVICE

PRIORITY CLAIM

This application claims priority to U.S. Provisional Application Ser. No. 62/276,614 entitled "PERSONAL HYGIENE ASSIST DEVICE" filed Jan. 8, 2015, which is incorporated herein by reference in its entirety.

BACKGROUND OF THE INVENTION

1. Field of the Invention

The present disclosure generally relates to a system to assist disabled persons conducting certain daily tasks. More particularly, the disclosure generally relates to systems and methods for assisting persons with limited dexterity to access and use common deodorant cases.

2. Description of the Relevant Art

There are many people who for various reasons have physical disabilities which negatively affects their manual dexterity. For example, physical disabilities may stem from amputations, neurological disorders, debilitating diseases, etc.

Persons with limited dexterity, especially relating to their hand/arm dexterity, may have great difficulty in performing any number of common daily chores. For example, tasks which require fine motors skills may be especially difficult. One such example is what most people would consider a simple task of putting on deodorant. The fine motor skills required to rotate a lower portion of a deodorant case in order to dispense the deodorant within is beyond the capabilities of many people.

Therefore a system and/or method which facilitates disabled persons accessing and using deodorant in commonly available commercial deodorant cases would be highly desirable.

SUMMARY

In some embodiments, a personal hygiene assist system may assist an impaired user in using deodorant. The system may include a container comprising an opening on an upper first side, opposite to a lower second side. The opening may include a substantially oblong shape configured to hold at least a lower portion of a deodorant case. The lower portion of the deodorant case may include an activation mechanism which upon rotation exposes additional deodorant positioned in the deodorant case. The system may include a handle coupled to a third side of the container, the third side coupling the first and second sides of the container. The handle may be larger than the activation mechanism of the deodorant case. The system may include an engaging mechanism positioned in the container and coupled to the handle. When the handle is rotated the engaging mechanism may engage and rotate the activation mechanism of the deodorant exposing additional deodorant positioned in the deodorant case.

In some embodiments, the engaging mechanism comprises a worm drive. The worm drive may include a worm and a worm gear. The worm may be coupled to the handle and engages, during use, the worm gear. In some embodiments, the handle rotates the worm which rotates the worm gear which rotates the activation mechanism of the deodorant case exposing additional deodorant positioned in the deodorant case.

In some embodiments, the handle may be larger than the activation mechanism of the deodorant case.

In some embodiments, the engaging mechanism transmits increased torque to the activation mechanism of the deodorant case relative to torque applied to the handle.

In some embodiments, the opening may include a complementary shape to the lower portion of a deodorant case.

BRIEF DESCRIPTION OF THE DRAWINGS

Advantages of the present invention may become apparent to those skilled in the art with the benefit of the following detailed description of the preferred embodiments and upon reference to the accompanying drawings.

Figure 1A:
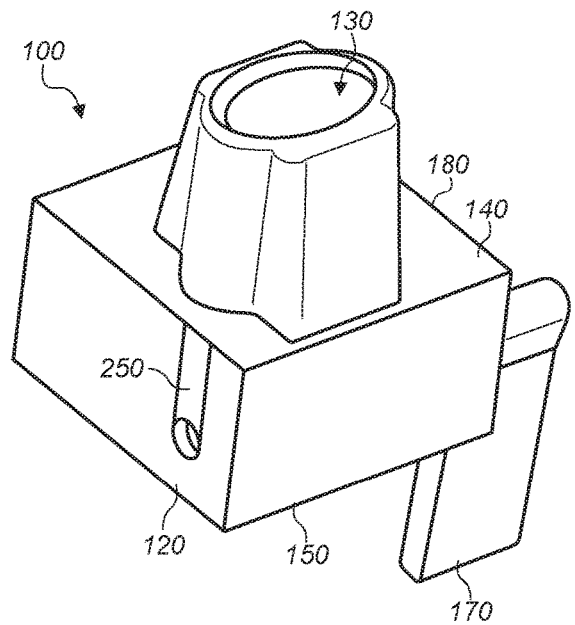
FIG. 1A-B depict diagrams of a top front perspective view of an exterior of an embodiment of a personal hygiene assist system with and without a deodorant case.

While the invention is susceptible to various modifications and alternative forms, specific embodiments thereof are shown by way of example in the drawings and may herein be described in detail. The drawings may not be to scale. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

The headings used herein are for organizational purposes only and are not meant to be used to limit the scope of the description. As used throughout this application, the word "may" is used in a permissive sense (i.e., meaning having the potential to), rather than the mandatory sense (i.e., meaning must). The words "include," "including," and "includes" indicate open-ended relationships and therefore mean including, but not limited to. Similarly, the words "have," "having," and "has" also indicated open-ended relationships, and thus mean having, but not limited to. The terms "first," "second," "third," and so forth as used herein are used as labels for nouns that they precede, and do not imply any type of ordering (e.g., spatial, temporal, logical, etc.) unless such an ordering is otherwise explicitly indicated. For example, a "third die electrically connected to the module substrate" does not preclude scenarios in which a "fourth die electrically connected to the module substrate" is connected prior to the third die, unless otherwise specified.

Similarly, a "second" feature does not require that a "first" feature be implemented prior to the "second" feature, unless otherwise specified.

Various components may be described as "configured to" perform a task or tasks. In such contexts, "configured to" is a broad recitation generally meaning "having structure that" performs the task or tasks during operation. As such, the component can be configured to perform the task even when the component is not currently performing that task. In some contexts, "configured to" may be a broad recitation of structure generally meaning performs the task or tasks during operation. As such, the component can be configured to perform the task even when the component is not currently on.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112, paragraph six, interpretation for that component.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

It is to be understood the present invention is not limited to particular devices or biological systems, which may, of course, vary. It is also to be understood that the terminology used herein is for the purpose of describing particular embodiments only, and is not intended to be limiting. As used in this specification and the appended claims, the singular forms "a", "an", and "the" include singular and plural referents unless the content clearly dictates otherwise. Thus, for example, reference to "a linker" includes one or more linkers.

DETAILED DESCRIPTION

Definitions

Unless defined otherwise, all technical and scientific terms used herein have the same meaning as commonly understood by one of ordinary skill in the art.

The term "connected" as used herein generally refers to pieces which may be joined or linked together.

The term "coupled" as used herein generally refers to pieces which may be used operatively with each other, or joined or linked together, with or without one or more intervening members.

The term "directly" as used herein generally refers to one structure in physical contact with another structure, or, when used in reference to a procedure, means that one process effects another process or structure without the involvement of an intermediate step or component.

The term "directly" as used herein generally refers to having an elongated shape, as a rectangle or an oval.

Embodiments

Figure 1B:
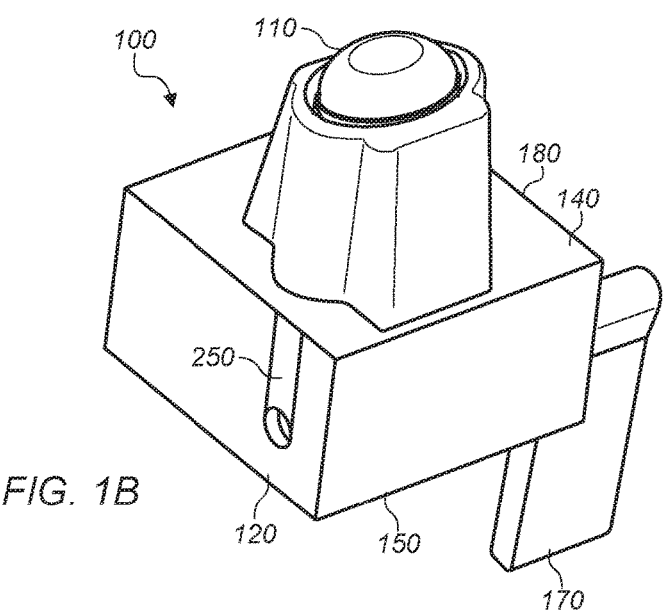
Figure 2:
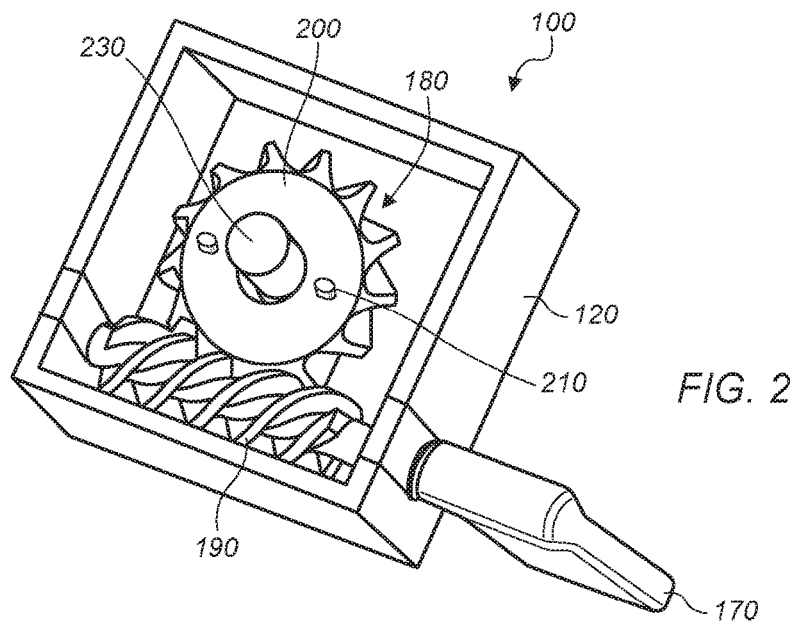
FIG. 2 depicts a diagram of a top front perspective view of an interior of an embodiment of a personal hygiene assist system.

A system and/or method which facilitate disabled persons accessing and using deodorant in commonly available commercial deodorant cases would be highly desirable. However, the embodiments, depicted herein should be viewed as exemplarily forms and not as limiting. The principles detailed herein may be used to facilitate disabled persons accessing/using commonly available commercial items other than deodorant. FIGS. 1A-B depict diagrams of a top front perspective view of an exterior of an embodiment of a personal hygiene assist system 100 with and without a deodorant case 110. FIG. 2 depicts a diagram of a top front perspective view of an interior of an embodiment of the personal hygiene assist system 100.

Figure 3:
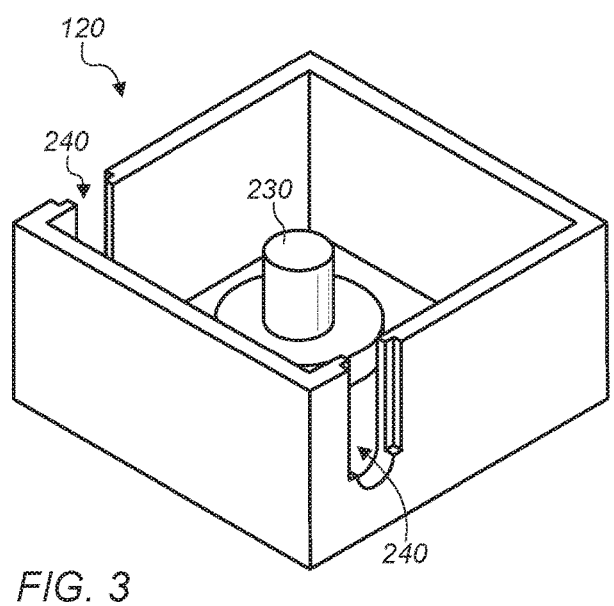
FIG. 3 depicts a diagram of a top front perspective view of an embodiment of a container of a personal hygiene assist system.
Figure 4B:
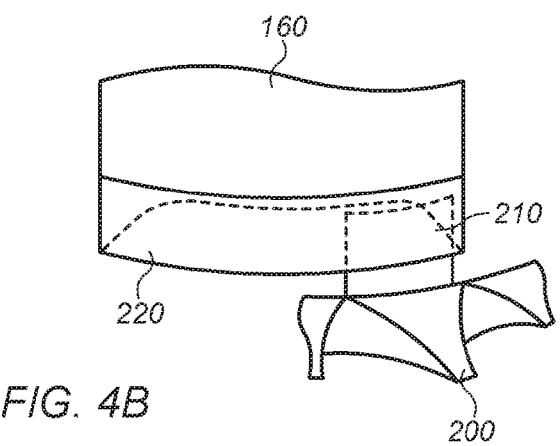
Figure 5:
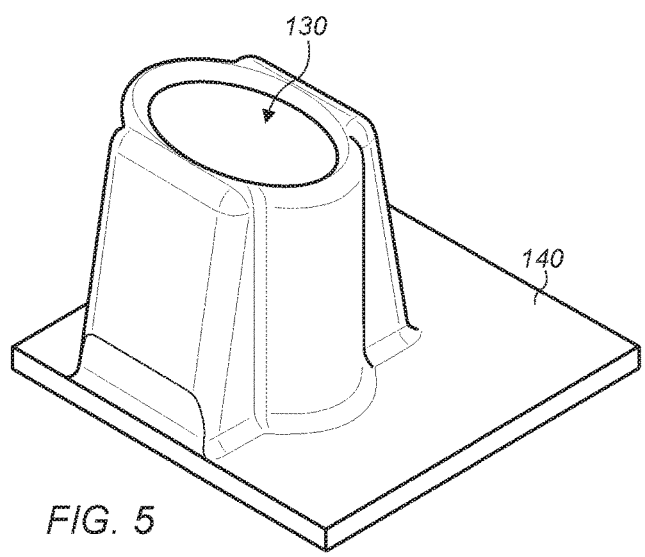
FIG. 5 depicts a diagram of a top front perspective view of an embodiment of a cover of a personal hygiene assist system.
Figure 7:
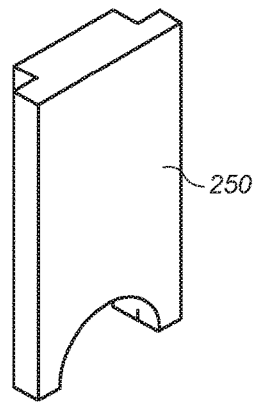
FIG. 7 depicts a diagram of a top front perspective view of an embodiment of an engaging mechanism coupler of a personal hygiene assist system.
Figure 6:
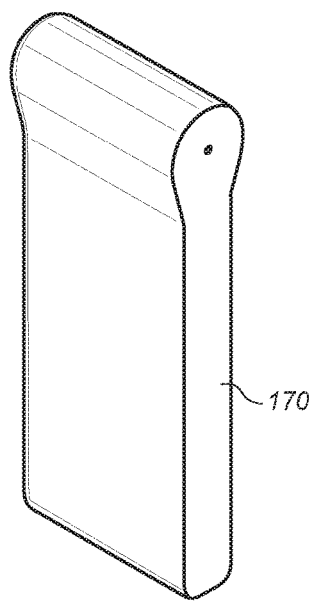
FIG. 6 depicts a diagram of a top front perspective view of an embodiment of a handle of a personal hygiene assist system.

In some embodiments, a personal hygiene assist system 100 may assist an impaired user in using deodorant. The system may include a container 120 (e.g., as depicted in FIG. 3) comprising an opening 130 (e.g., as depicted in FIGS. 1A and 5) on an upper first side 140, opposite to a lower second side 150. The opening 130 may include a substantially oblong shape configured to hold at least a lower portion 160 (e.g., as depicted in FIG. 4B) of a deodorant case 110. In some embodiments, the opening may include a complementary shape to the lower portion of a deodorant case. The lower portion 160 of the deodorant case 110 may include an activation mechanism which upon rotation exposes additional deodorant positioned in the deodorant case.

In some embodiments, the system may include a handle 170 (e.g., as depicted in FIGS. 1A-B, 4B, and 6) coupled to a third side 180 coupling the first 140 and second 150 sides. In some embodiments, the handle may be larger than the activation mechanism of the deodorant case. The handle may be shaped to facilitate a user ability to rotate or activate the handle. The handle may be sized to facilitate a user ability to rotate or activate the handle. Users with manual dexterity issues may find it easier to rotate the handle as depicted in order to expose additional deodorant positioned in the deodorant case. For example users with amputated limbs may be able to manipulate handle 170.

Figure 4A:
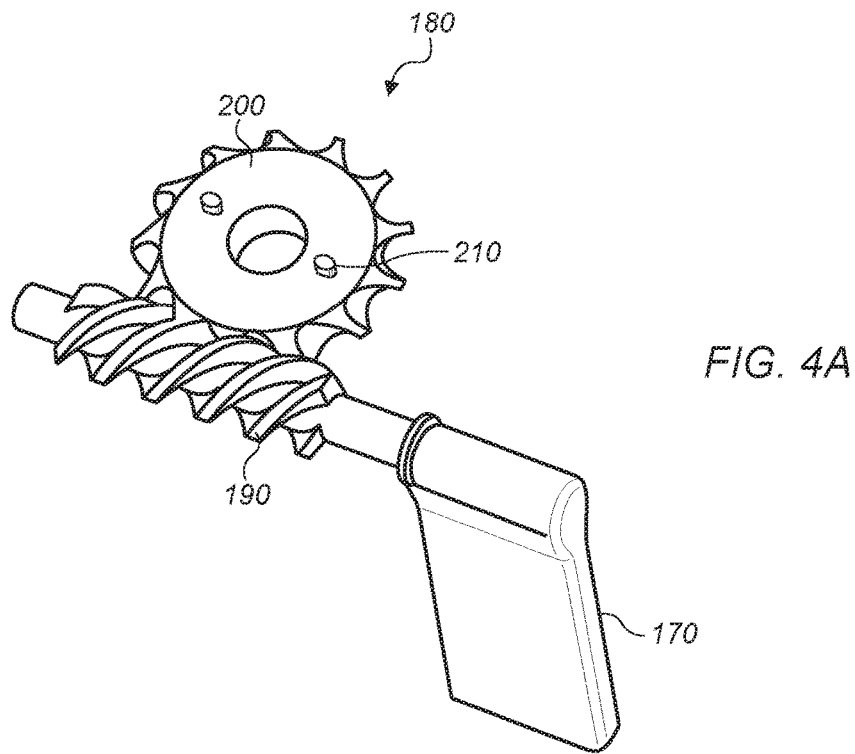
FIGS. 4A-B depict a diagram of a top front perspective view of an embodiment of an engaging mechanism of a personal hygiene assist system and a diagram of a side view of an embodiment of an engager of a worm gear interacting with a portion of a deodorant case respectively.

In some embodiments, the system may include an engaging mechanism 180 (e.g., as depicted in FIGS. 2 and 4A) positioned in the container 120 and coupled to the handle 170. When the handle is rotated the engaging mechanism may engage and rotate the activation mechanism of the deodorant exposing additional deodorant positioned in the deodorant case. In some embodiments, the engaging mechanism may reduce rotational speed or transmit higher torque. In some embodiments, the engaging mechanism transmits increased torque to the activation mechanism of the deodorant case relative to torque applied to the handle.

In some embodiments, the engaging mechanism 180 comprises a worm drive. The worm drive may include a worm 190 and a worm gear 200 (e.g., as depicted in FIGS. 2 and 4A). The worm may be coupled to the handle 170 and engages, during use, the worm gear. In some embodiments, the handle rotates the worm which rotates the worm gear which rotates the activation mechanism of the deodorant case exposing additional deodorant positioned in the deodorant case.

A gearbox designed using a worm and worm-wheel is considerably smaller than one made from plain spur gears, and has its drive axes at 90° to each other. With, for example, a single start worm, for each 360° turn of the worm, the worm-gear advances only one tooth of the gear. Therefore, regardless of the worm's size (sensible engineering limits notwithstanding), the gear ratio is the "size of the worm gear-to-1"; with, for example, a single start worm, a 20 tooth worm gear reduces the speed by the ratio of 20:1. Looking to spur gears, a gear of 12 teeth must match with a 240 tooth gear to achieve the same 20:1 ratio. Therefore, if the diametrical pitch (DP) of each gear is the same, then, in terms of the physical size of the 240 tooth gear to that of the 20 tooth gear, the worm arrangement is considerably smaller in volume.

It should be noted that other types of gears might be used. In fact the retention (handling the vertical slip) of the gear, and the mechanical actuation could be opened up to more than a worm gear. However worm drives may provide certain advantages (e.g., compactness, and as mentioned reduce rotational speed or transmit higher torque). There are three different types of gears that can be used in a worm drive. The first are non-throated worm gears. These do not have a throat, or groove, machined around the circumference of either the worm or worm wheel. The second are single-throated worm gears, in which the worm wheel is throated. The final type include double-throated worm gears, which have both gears throated. This type of gearing can support the highest loading. An enveloping (hourglass) worm has one or more teeth and increases in diameter from its middle portion toward both ends. Double-enveloping wormgearing comprises enveloping worms mated with fully enveloping wormgears. It may be known as globoidal wormgearing.

In some embodiments, the engaging mechanism may include engagers 210 (e.g., as depicted in FIGS. 2, 4A-B, and 8) which engage the activation mechanism of the deodorant case 110. The engagers may be coupled to, for example, the worm gear 200. The engagers may engage the activation mechanism of the deodorant during use. In some embodiments, the engagers may press against the activation mechanism during use rotating the lower portion of the deodorant case. In some embodiments, the engagers 210 may at least partially fit with one or more openings 220 of an underside of the activation mechanism during use rotating the lower portion of the deodorant case 110 (e.g., as depicted in FIG. 4B).

Figure 8:
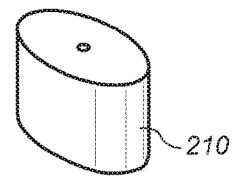
FIG. 8 depicts a diagram of a top front perspective view of an embodiment of an engaging mechanism gear block of a personal hygiene assist system.

In some embodiments, system 100 may be assembled such that worm gear 200 may be positioned in container 120 atop an elongated member 230 (e.g., as depicted in FIGS. 2-3). The worm 190 may be positioned in the container 120 such that the worm engages the worm gear 200 during use (e.g., as depicted in FIG. 2). The worm 190 may be positioned in the container 120 such that opposing ends are supported in slots 240 of the container (e.g., as depicted in FIG. 3). The system 100 may include inserts 250 (e.g., as depicted in FIG. 8) which are shaped to mate to (e.g., forming a friction fit) with the slots 240. Inserts 250 may function to inhibit translational movement of the worm 190 while allowing rotational movement of the worm relative to the container 120 (e.g., as depicted in FIGS. 1A-B).

In some embodiments, a method may include accessing deodorant in a deodorant case. In some embodiments, a method may include positioning at least a lower portion of a deodorant case in an opening positioned in an upper first side, opposite to a lower second side, of a container. The opening may include a complementary shape to the lower portion of the deodorant case. The method may include rotating a handle coupled to a third side coupling the first and second sides. The method may include engaging an activation mechanism of the deodorant case using an engaging mechanism positioned in the container and coupled to the handle. The method may include exposing additional deodorant positioned in the deodorant case.

In some embodiments, the personal hygiene assist system 100 may be formed from one or more rigid materials. Materials that may be used include polymers which are rigid, strong and/or lightweight. Of course different portions of the system may be formed from different materials as appropriate. Materials may include natural materials such as wood, metal, and/or stone. Materials may include man made materials such as plastics. Moldable plastics may be particularly useful for forming the system 100.

In this patent, certain U.S. patents, U.S. patent applications, and other materials (e.g., articles) have been incorporated by reference. The text of such U.S. patents, U.S. patent applications, and other materials is, however, only incorporated by reference to the extent that no conflict exists between such text and the other statements and drawings set forth herein. In the event of such conflict, then any such conflicting text in such incorporated by reference U.S. patents, U.S. patent applications, and other materials is specifically not incorporated by reference in this patent.

Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A personal hygiene assist system, comprising:
    a container comprising an opening on an upper first side, opposite to a lower second side, wherein the opening comprises a complementary shape to a lower portion of a deodorant case and configured to hold at least the lower portion of a deodorant case, wherein the lower portion of the deodorant case comprises an activation mechanism which upon rotation exposes additional deodorant positioned in the deodorant case;
    a handle coupled to a third side coupling the first and second sides; and
    an engaging mechanism positioned in the container and coupled to the handle, wherein when the handle is rotated the engaging mechanism engages and rotates the activation mechanism of the deodorant case exposing additional deodorant positioned in the deodorant case, and wherein the engaging mechanism comprises a worm drive.

2. The system of claim 1, wherein the worm drive comprises a worm and a worm gear.

3. The system of claim 1, wherein the worm drive comprises a worm and a worm gear, wherein the worm is coupled to the handle and engages, during use, the worm gear.

4. The system of claim 3, wherein the handle rotates the worm which rotates the worm gear which rotates the activation mechanism of the deodorant case exposing additional deodorant positioned in the deodorant case.

5. The system of claim 1, wherein the handle is larger than the activation mechanism of the deodorant case.

6. The system of claim 1, wherein the engaging mechanism transmits increased torque to the activation mechanism of the deodorant case relative to torque applied to the handle.

7. The system of claim 1, wherein the opening comprises a substantially oblong shape.

8. A method of accessing deodorant in a deodorant case, comprising:

poisoning at least a lower portion of a deodorant case in an opening positioned in an upper first side, opposite to a lower second side, of a container, wherein the opening comprises a complementary shape to the lower portion of the deodorant case;

engaging an activation mechanism of the deodorant case using an engaging mechanism positioned in the container and coupled to a handle, wherein the engaging mechanism comprises a worm drive;

exposing additional deodorant positioned in the deodorant case.

9. The method of claim 8, wherein the opening comprises a substantially oblong shape.

10. The method of claim 8, wherein the worm drive comprises a worm and a worm gear.

11. The method of claim 8, wherein the worm drive comprises a worm and a worm gear, wherein the worm is coupled to the handle and engages, during use, the worm gear.

12. The method of claim 11, wherein the handle rotates the worm which rotates the worm gear which rotates the activation mechanism of the deodorant case exposing additional deodorant positioned in the deodorant case.

13. The method of claim 8, wherein the handle is larger than the activation mechanism of the deodorant case.

14. The method of claim 8, wherein the engaging mechanism transmits increased torque to the activation mechanism of the deodorant case relative to torque applied to the handle.

15. The method of claim 8, further comprising rotating the handle coupled to a third side coupling the first and second sides.

* * * * *